United States Patent

Maffre et al.

[11] Patent Number: 5,884,870
[45] Date of Patent: Mar. 23, 1999

[54] DEVICE FOR MAINTAINING THE SPEED OF AN AIRCRAFT WITHIN A PARTICULAR SPEED RANGE

[75] Inventors: Claude Maffre, La Salvetat St Gilles; Jean Muller, Toulouse, both of France

[73] Assignee: Aerospatiale Societe Nationale Industrielle, Paris, France

[21] Appl. No.: 829,081

[22] Filed: Mar. 31, 1997

[30] Foreign Application Priority Data

Apr. 5, 1996 [FR] France .................................. 96 04311

[51] Int. Cl.⁶ ........................................................ G05D 1/08
[52] U.S. Cl. .......................... 244/182; 244/180; 244/181
[58] Field of Search ................................. 244/180, 181, 244/182; 701/7

[56] References Cited

U.S. PATENT DOCUMENTS

| | | |
|---|---|---|
| 3,860,800 | 1/1975 | Simpson . |
| 4,044,975 | 8/1977 | Blechen et al. . |
| 4,577,275 | 3/1986 | Adams et al. . |
| 4,590,475 | 5/1986 | Brown ..................................... 340/966 |
| 4,764,872 | 8/1988 | Miller . |
| 4,841,448 | 6/1989 | Ford ....................................... 364/433 |
| 4,967,363 | 10/1990 | Bonafe . |
| 5,031,102 | 7/1991 | Robbins et al. . |
| 5,079,711 | 1/1992 | Lambregts et al. . |
| 5,730,394 | 3/1998 | Cotton et al. . |

FOREIGN PATENT DOCUMENTS 84 01345  12/1984  WIPO .
92 20052  12/1992  WIPO .

OTHER PUBLICATIONS

French Search Report dated Jul. 1, 1997, 3 pages.

Primary Examiner—Charles T. Jordan
Assistant Examiner—Tien Dinh
Attorney, Agent, or Firm—Marshall, O'Toole, Gerstein, Murray & Borun

[57] ABSTRACT

An automatic device for maintaining an aircraft at an authorized speed compatible with the technical capabilities of the aircraft includes:

a system for comparing the effective speed of the aircraft with reference speeds defined in accordance with the technical capabilities of the aircraft, a system for calculating, on the basis of such comparison, modified control values to align the effective speed with these reference speeds, and a system for imposing one of these calculated values on the aircraft, if this is necessary to maintain the aircraft at an authorized speed.

14 Claims, 2 Drawing Sheets

DEVICE FOR MAINTAINING THE SPEED OF AN AIRCRAFT WITHIN A PARTICULAR SPEED RANGE

BACKGROUND OF THE INVENTION

1. Field of the Invention

The present invention concerns a device for maintaining the speed of an aircraft within a speed range (operational range) delimited by the maximal speed and the minimal speed authorized by the technical capabilities of said aircraft, regardless of the flight path commanded.

It will be noted that the invention applies more particularly to an aircraft, especially a commercial aircraft, having control means for applying to said aircraft a commanded rate of climb and a commanded speed, based on received control values.

2. Description of the Prior Art

In the manner that is known in itself, said control means are incorporated:

either in the automatic pilot of the aircraft, which is capable of operating:

directly through appropriate control units known in themselves on control surfaces of the aircraft to modify its rate of climb; and indirectly on the propulsion system to modify the thrust; the speed of the aircraft is the result of the rate of climb/thrust combination;

or in the flight director which indicates to the pilot the movements to be applied to the pitch axis control to obtain the required flight path.

Consequently, the use of an automatic pilot completely automates the control of speed and rate of climb, whereas the use of a flight director necessitates the intervention of the pilot.

Despite these differences, and although the present description refers first and foremost to an automatic pilot, the invention applies equally well to an aircraft provided with an automatic pilot and to an aircraft provided with a flight director.

For a rate of climb of the aircraft corresponding to an imposed control value, maintaining the speed of the aircraft at a prescribed value is effected, in a manner that is known in itself, by controlling the thrust generated by the propulsion system of said aircraft, such control being effected:

either manually, by the pilot, by appropriate movement of the throttle control;

or automatically, by means of an automatic thrust control system.

Under the above conditions, maintaining the speed in the operational range is impossible in the following situations:

firstly, if for a positive imposed rate of climb, i.e. one which corresponds to the aircraft climbing, the speed produced by the maximal thrust that can be generated by the propulsion system falls below the prescribed minimal speed; and secondly, if for a negative imposed rate of climb, i.e. one which corresponds to the aircraft descending, the speed produced by the minimal thrust rises above the prescribed maximal speed.

To remedy these critical situations, the automatic pilot includes internal protection devices incorporated in localized decision centers relating to the various possible modes of operation of the aircraft which either limit the control values imposed on the automatic pilot or modify the mode of operation so that the imposed rate of climb is compatible with the prescribed maximal and minimal reference speeds.

These internal protection devices have many drawbacks, however, including:

duplication of protection is necessary at each protected decision center; and, more importantly the extent of protection is limited to the field of application of the corresponding decision center with its own authority, in particular when the aircraft is in cruise mode, which can lead to a large and highly prejudicial excursion of the speed of the aircraft out of the range delimited by the authorized minimal and maximal speeds.

An object of the present invention is to remedy these drawbacks. The present invention concerns a device for automatically maintaining the speed of an aircraft, in particular of a commercial aircraft, within a speed range delimited by minimal and maximal speeds authorized by the technical capabilities of said aircraft.

SUMMARY OF THE INVENTION

To this end, in accordance with the invention, said device includes:

control means for applying a controlled rate of climb to said aircraft;

means for determining the effective speed of said aircraft;

means for comparing said effective speed with said maximal and minimal speeds, respectively;

means for calculating, on the basis of said comparison, two modified control values adapted to align said effective speed with said maximal and minimal speeds, respectively, by modification of said rate of climb; and priority action means for imposing on said control means one of said modified control values if such action is necessary to maintain the speed of said aircraft within said speed range.

Accordingly, with the invention, if for a commanded rate of climb the effective speed of the aircraft either falls below the authorized minimal speed or rises above the authorized maximal speed, with a phase advance, the priority action means of the device of the invention impose on the control means a modified control value that leads to a modification of the rate of climb of the aircraft in such manner as to cause the speed of the aircraft to return within the authorized speed range.

To modify said rate of climb, said control means advantageously use the value of a reference parameter as the control value. In accordance with the invention, said reference parameter can be:

the rate of pitch of the aircraft;

the longitudinal attitude of the aircraft; or the load factor, which corresponds to the difference between the vertical acceleration of the aircraft and the acceleration due to gravity.

In one particularly advantageous embodiment of the invention, said comparator means and said calculator means are incorporated into one and the same calculator system.

Said calculator system advantageously includes:

a first calculator unit which determines from said effective speed and from said maximal speed a first control value corresponding to the value of said reference parameter for which said aircraft may be brought to said maximal speed;

a second calculator unit which determines from said effective speed and from said minimal speed a second control value corresponding to the value of said reference parameter for which said aircraft may be brought to said minimal speed;

a third calculator unit which determines from the effective rate of climb of said aircraft a third control value corresponding to the value of said reference parameter for which said aircraft may be brought to a zero rate of climb;

a first selector unit which chooses either said first control value or said third control value as said first modified control value, according to which of them produces the greater nose-down attitude of said aircraft; and a second selector unit which chooses either said second control value or said third control value as said second modified control value, according to which of them produces the greater nose-up attitude of said aircraft.

Said priority action means are advantageously adapted to select the median value between said first and second modified control values and the set point control value determined by the pilot of said aircraft. In the context of the present invention, said set point control value represents the control value selected by the pilot (or the automatic pilot).

Said selector unit is advantageously adapted to select the median value between said first and third control values and a control value leading to a theoretical extreme nose-down attitude that cannot be achieved by said aircraft, whereas said second selector unit is advantageously adapted to select the median value between said second and third control values and a control value leading to a theoretical extreme nose-up attitude that cannot be achieved by said aircraft.

In one particularly advantageous embodiment of the invention, using the load factor as the reference parameter:

said first and second load factor control values are advantageously respectively proportional to the differences between said effective speed and said maximal and minimal speeds, respectively, and said load factor third control value is advantageously proportional to the effective rate of climb of the aircraft.

The absolute value of each of said first and second control values is advantageously limited to a predefined maximal value, for example 0.3 g, where g represents the acceleration due to gravity. Accordingly, movements of the aircraft generated by such limited control values produce a modified rate of climb of the aircraft that is a satisfactory compromise between the comfort of the passengers and the effectiveness of the protection against violation of the maximal and minimal speeds.

The device of the invention may advantageously include inhibitor means adapted to inhibit the priority action of the means for imposing the modified control value so that the control means receive directly only the set point control value.

Accordingly, the device of the invention can be inactivated by actuating said inhibitor means. This facility may be used, for example, if the aircraft is in a flight phase for which maintaining the flight path and therefore the rate of climb is more important than maintaining the speed.

The figures of the accompanying drawings explain how the invention may be put into effect. In the figures, the same reference numbers designate similar components.

DETAILED DESCRIPTION OF THE PREFERRED EMBODIMENT

Figure 1:
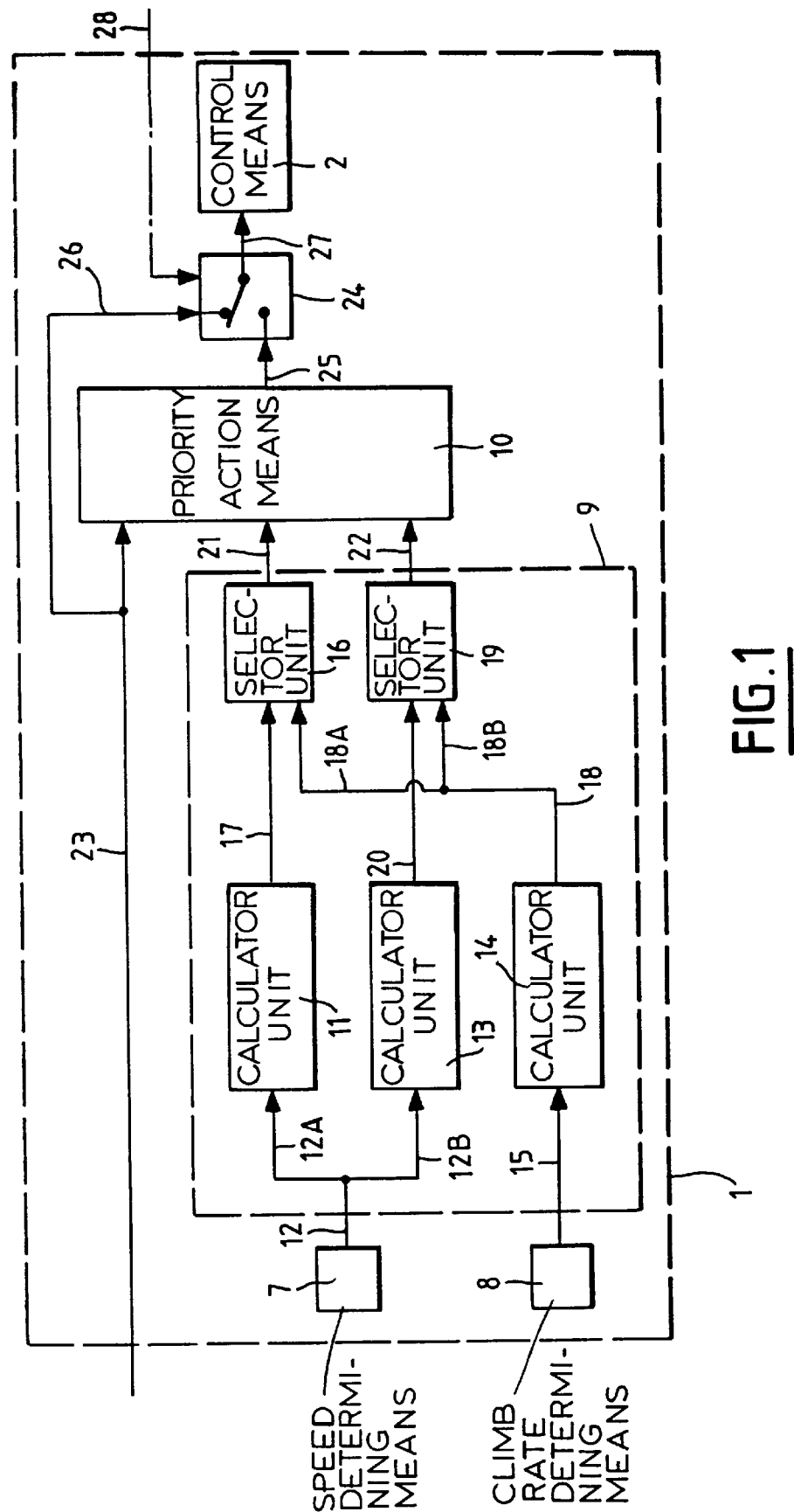
FIG. 1 is the block schematic of a device of the invention.
Figure 2:
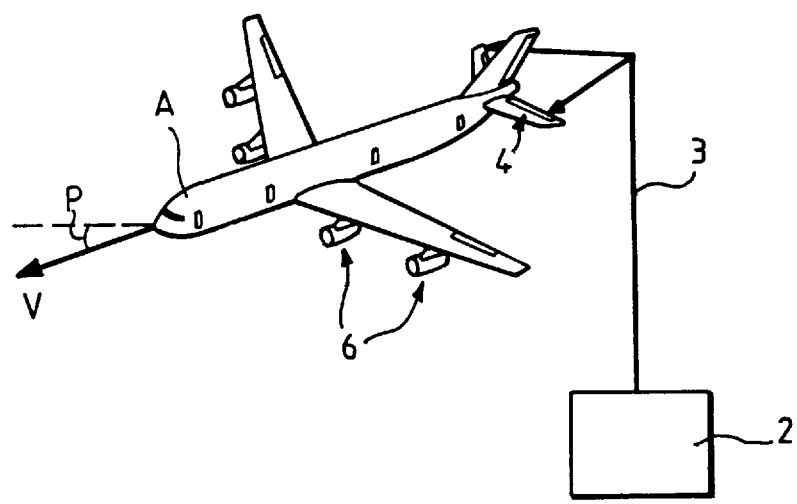
FIG. 2 shows the action of aircraft rate of climb and speed control means.

The device 1 of the invention shown diagrammatically in FIG. 1 is mounted on an aircraft A, for example a commercial aircraft, having an automatic pilot and/or a flight director, not shown, to maintain the aircraft A at a speed V compatible with the operational range of said aircraft A, as shown in FIG. 2.

To this end, said device 1 includes the following means that are known in themselves:

control means 2 for applying to said aircraft A a controlled rate of climb and a controlled speed, on the basis of received control values. In a manner that is known in itself, said control means 2 are incorporated into the automatic pilot of the aircraft A and are adapted to operate on the elevators 4 of the aircraft A to modify its rate of climb P, as shown in FIG. 2, through the intermediary of appropriate control members, not shown, indicated by a connection 3. Note that the speed is controlled by controlling the thrust of the propulsion system 6, by means of the autopilot, not shown, or by action of the pilot on the throttle controls, also not shown;

means 7 known in themselves for determining the effective speed V of said aircraft A; and means 8 known in themselves for determining the effective rate of climb P of said aircraft A.

In the context of the present invention said control means 2 can also be integrated, if necessary, into the flight director, not shown, of the aircraft, which in a manner that is known in itself tells the pilot the maneuvers to be applied to the pitch axis control to obtain the required rate of climb.

In practise the effective speed of the aircraft may diverge from the commanded speed, for example if the propulsion system 6 is not able to supply the necessary thrust when the commanded rate of climb is too high.

Obviously, for reasons of safety and for reasons relating to the technical capabilities of the aircraft, the speed of said aircraft must be maintained within limited ranges of values. To this end, the automatic pilot is generally provided with internal protection devices which, among other things, limit the control values imposed on said automatic pilot.

However, the extent of such protection is limited so that a large and potentially highly prejudicial excursion of the speed out of the prescribed speed range is possible.

The device 1 of the invention is designed to prevent any such excursion by automatically maintaining the aircraft A at a speed compatible with the technical capabilities of said aircraft, and is therefore, among other things, intended to remedy the drawbacks of the internal protection devices previously referred to.

To achieve this objective, said device 1 includes, in accordance with the invention, in addition to the means 2, 7 and 8 known in themselves previously referred to:

a calculator system 9 which includes, as explained in more detail hereinafter:

means for comparing the effective speed of the aircraft with two reference speeds by determining the difference from said values (said reference speeds are defined on the basis of the technical capabilities of the aircraft and correspond to the maximal operational speed and the minimal operational speed); and means for calculating, on the basis of such comparison, two modified control values adapted to align said effective speed with the respective reference speed; and priority action means 10 for imposing on said control means 2 one of said modified control values if such action is necessary to maintain the speed of the aircraft A within the authorized speed range.

In the context of the present invention, the control values used by the control means 2 correspond to the values of a reference parameter which may be, for example, the speed of the aircraft, the longitudinal attitude of said aircraft or the load factor, which corresponds to the difference between the vertical acceleration of the aircraft A and the acceleration due to gravity.

In the particularly advantageous embodiment of the invention shown in FIG. 2, said calculator system 9 includes:

a calculator unit 11 connected by a branch 12A of a connection 12 to the means 7 and which determines, from the effective speed V of the aircraft A received by the means 7 and from the recorded maximal reference speed, a first control value corresponding to the value of said reference parameter for which the aircraft A may be brought to said maximal speed;

a calculator unit 13 connected by a branch 12B of the connection 12 to the means 7 and which determines, from the effective speed V received by the means 7 and from the recorded minimal reference speed, a second control value corresponding to the value of said reference parameter for which the aircraft A may be brought to said minimal speed;

a calculator unit 14 connected by a connection 15 to the means 8 and which determines, from the effective rate of climb P of the aircraft received by said means 8, a third control value corresponding to the value of said reference parameter for which the aircraft A may be brought to a zero rate of climb;

a selector unit 16 connected to the calculator units 11 and 14 respectively by a connection 17 and by a branch 18A of a connection 18 and which chooses either said first control value or said third control value as the first modified control value, depending on which of them produces the greater nose-down attitude of the aircraft A; and a selector unit 19 connected to the calculator units 13 and 14 respectively by a link 20 and by a branch 18B of the link 18 and which chooses either said second control value or said third control value as the second modified control value, depending on which of them produces the greater nose-up attitude of the aircraft A.

Figure 3:
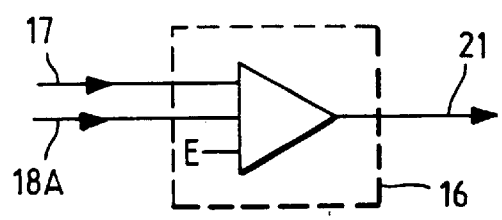
FIG. 3 shows a selector component of the device of the invention.

In one advantageous embodiment, said selector units 16 and 19 select and transmit the median value of three different values, as shown for the selector unit 16 in FIG. 3.

For said selector unit 16, the three values considered are: the first control value received over the connection 17; the third control value received over the branch 18A of the connection 18; and a recorded control value E leading to a theoretical extreme nose-down attitude that cannot be achieved by the aircraft.

The selector unit 19 uses the second and third control values and a recorded value leading to an extreme theoretical nose-up attitude that cannot be achieved by the aircraft.

Similarly, the means 10 are adapted to select the median value between:

the first modified control value received from the selector unit 16 over a connection 21;

the second modified control value received from the selector unit 19 over a link 22; and the set point control value, selected by the pilot, which is received over a link 23 from means that are known in themselves, not shown, enabling the aircraft A to be held at the set point determined by the pilot.

In the usual case, i.e. in the absence of the device 1 of the invention, said set point control value is transmitted as such directly to the control means 2 which apply it to the aircraft A.

Said median value selected by the means 10 is transmitted to the control means 2 which then command:

either maintenance of the set point control value, if the latter has been selected, i.e. if the effective speed V of the aircraft A is between the prescribed minimal and maximal speeds;

or modification of the control value, if one of the modified control values has been selected.

Such modification of the set point control value is effected in the following cases:

if for a positive rate of climb the effective speed V of the aircraft A drops below the prescribed minimal speed, for a given thrust of the propulsion system 6, so that the selected value is the second control value, which causes a reduction in the effective rate of climb (and therefore an increase in the speed);

if for a negative rate of climb the effective speed V of the aircraft A rises above the prescribed maximal speed, for a given thrust, so that the selected value is the first control value, which causes an appropriate modification of the effective rate of climb (leading to a reduction of the speed); or if the measured values supplied by the means 7 and 8 are incompatible, or in the event of failure of an essential component of the device 1 or of the automatic pilot, in which case the selected value is then the third control value which brings the aircraft to horizontal flight, i.e. a zero rate of climb.

Thus the speed of the aircraft is always held within the authorized speed range and in the extreme situation the aircraft is levelled out (zero rate of climb).

The device 1 also includes inhibitor means 24 connected by a connection 25 to the output means 10, by a connection 26 to the connection 23 transmitting the set point control value and by a connection 27 to the input of the control means 2. Said inhibitor means 24 can be:

either in an inactive position, in which they connect the connection 25 to the connection 27 so that the device 1 is activated;

or in an inactive position, in which they connect the connection 26 to the connection 27 so that the action of the device 1 is inhibited and the control means 2 continue to receive the set point control value directly. This inhibited position may be selected, in particular, if the aircraft is in a flight phase for which maintaining the flight path and therefore the rate of climb is more important than maintaining the speed.

Said inhibitor means 24 may be switched between said action and inhibition positions by means of a connection 28:

either manually by the pilot when the pilot deems this to be necessary or useful;

or automatically, by appropriate means, not shown, commanding switching over in accordance with the modes of operation of the automatic pilot.

There is claimed:

1. An automatic device for maintaining the speed of an aircraft within a speed range delimited by minimal and maximal speeds authorized by the technical capabilities of said aircraft, said device including:

control means for applying a commanded rate of climb to said aircraft;

means for determining the effective speed of said aircraft;

means for comparing said effective speed with said maximal and minimal speeds, respectively;

means for calculating, on the basis of said comparison, two modified control values adapted to align said effective speed with said maximal and minimal speeds, respectively, by modification of said rate of climb; and priority action means for imposing on said control means one of said modified control values if such action is necessary to maintain the speed of said aircraft within said speed range.

2. The device claimed in claim 1 wherein said control means use a value of a reference parameter as a control value.

3. The device claimed in claim 1 wherein said comparator means and said calculator means are incorporated into one and the same calculator system.

4. The device claimed in claim 3 wherein said calculator system includes:

a first calculator unit which determines from said effective speed and from said maximal speed a first control value corresponding to the value of said reference parameter for which said aircraft may be brought to said maximal speed;

a second calculator unit which determines from said effective speed and from said minimal speed a second control value corresponding to the value of said reference parameter for which said aircraft may be brought to said minimal speed;

a third calculator unit which determines from the effective rate of climb of said aircraft a third control value corresponding to the value of said reference parameter for which said aircraft may be brought to a zero rate of climb;

a first selector unit which chooses either said first control value or said third control value as said first modified control value according to which of them produces a greater nose-down attitude of said aircraft; and a second selector unit which chooses between said second control value or said third control value as said second modified control value according to which of them produces a greater nose-up attitude of said aircraft.

5. The device claimed in claim 4 wherein said priority action means are adapted to select a median value between said first and second modified control values and the set point control value determined by the pilot of said aircraft.

6. The device claimed in claim 4 wherein said selector unit is adapted to select a median value between said first and third control values and a control value leading to a theoretical extreme nose-down attitude that cannot be achieved by said aircraft.

7. The device claimed in claim 4 wherein said second selector unit is adapted to select a median value between said second and third control values and a control value leading to a theoretical extreme nose-up attitude that cannot be achieved by said aircraft.

8. The device claimed in claim 2 wherein said reference parameter is the rate of pitch of said aircraft.

9. The device claimed in claim 2 wherein said reference parameter is the longitudinal attitude of said aircraft.

10. The device claimed in claim 2 wherein said reference parameter is the load factor, which corresponds to the difference between the vertical acceleration of said aircraft and the acceleration due to gravity.

11. The device claimed in claim 4 wherein said first and second load factor control values are respectively proportional to the differences between said effective speed and said maximal and minimal speeds, respectively.

12. The device claimed in claim 4 wherein said third load factor control value is proportional to the effective rate of climb of said aircraft.

13. The device claimed in claim 4 wherein the absolute value of said first and second control values is limited to a predefined maximal value.

14. A device as claimed in claim 1 including inhibitor means adapted to inhibit the priority action of the means adapted to impose a modified control value so that said control means receive directly only a set point control value determined by the pilot of said aircraft.

* * * * *